United States Patent [19]

Laughlin et al.

[11] Patent Number: 5,550,314
[45] Date of Patent: Aug. 27, 1996

[54] METHOD OF ENVIRONMENTALLY STABILIZING LEAD PAINT CONTAMINATED DEBRIS

[76] Inventors: Joe A. Laughlin, 8 Shadow La., Houston, Tex. 77080; Larry C. Thyssen, 1042 Orchard Hill, Houston, Tex. 77077

[21] Appl. No.: 395,614

[22] Filed: Feb. 27, 1995

[51] Int. Cl.⁶ .................... A62D 3/00; B09B 3/00
[52] U.S. Cl. .................. 588/256; 588/236; 588/252; 588/260; 405/129
[58] Field of Search .................... 405/128, 129; 588/236, 249, 252, 256, 260; 106/697; 210/751

[56] References Cited

U.S. PATENT DOCUMENTS

| | | | |
|---|---|---|---|
| 4,226,630 | 10/1980 | Styron | 588/256 X |
| 4,687,373 | 8/1987 | Falk et al. | 588/252 |
| 5,193,936 | 3/1993 | Pal et al. | 405/128 |
| 5,234,498 | 8/1993 | Graves, Jr. | 588/252 X |
| 5,288,171 | 2/1994 | Smith et al. | 405/129 |
| 5,320,450 | 6/1994 | Smith | 405/129 |
| 5,367,116 | 11/1994 | Frey | 588/252 |

*Primary Examiner*—George A. Suchfield
*Attorney, Agent, or Firm*—Bill B. Berryhill

[57] ABSTRACT

A method of immobilizing or stabilizing lead paint contaminated construction or demolition debris in which the debris is shredded, mixed with water and a chemical, such as fly ash, lime, Portland cement or kiln dust. The treated debris is then collected and allowed to stand for a period of time sufficient for the lead paint to be converted from a soluble form to an insoluble form. Excess water may be drained and collected and the treated and lead paint stabilized debris disposed of.

10 Claims, 1 Drawing Sheet

5,550,314

METHOD OF ENVIRONMENTALLY STABILIZING LEAD PAINT CONTAMINATED DEBRIS

BACKGROUND OF THE INVENTION

1. Field of the Invention

The present invention pertains to treatment, handling and disposal of construction or demolition debris. More specifically, the present invention pertains to methods of handling, treating and disposing of lead paint contaminated construction or demolition debris.

2. Description of the Prior Art

In the past, many building material surfaces were painted with lead based paint. The material or substrate on which the paint was applied could have been wood, gypsum, particle board, glass, etc. The paint is usually absorbed into the porous substrate material, making it impossible to mechanically remove all of the lead paint by sanding or scraping without removing significant amounts of the substrate.

Ingestion or inhalation of lead is a serious health hazard for both children and adults. Children are more likely to encounter lead from its use in residential surroundings. Although adults are less likely to ingest lead paint, they may inhale lead dust or vapors from soil residue, the sanding or scraping of lead paint and other work related activities. As stated, lead paint is not easy to remove from the substrate to which it is applied, particularly wood. If removal of the paint is attempted by scraping or sanding, power tools may be used, exacerbating inhalation or hazards and releasing large amounts of lead contaminated dust into the atmosphere, requiring costly controlled methods of preventing contamination to the surrounding environment. Even after such precautions, substantial amounts of lead paint may remain absorbed by the substrate.

After certain periods of time, many building structures are demolished. The debris, often contaminated by lead paint, must be disposed of under applicable environmental regulations. If the debris includes lead based paint or other hazardous materials, it should, under properly interpreted government regulations, be treated as contaminated hazardous waste. Handling and disposing of such hazardous waste involves expensive and time consuming treatment, transportation, storage, disposal and documentation procedures.

In the past, lead paint contaminated debris has been improperly disposed of in municipal landfills or solid waste disposal facilities by not performing testing or by testing a composite sample of lead paint on underlying substrate of wood or other materials. Because the paint is only a few mils thick on a much thicker substrate, e.g. 1 inch to 4 inch wood, the results of such a test may be determined to be non-hazardous by virtue of dilution. This method of disposal clearly violates regulations which require that if listed hazardous waste is mixed with non-hazardous waste, the mixture thereof is to be considered hazardous.

There are improved methods of handling construction and demolition debris so that the debris can be disposed of in landfills or recycled for road bed materials. Examples of such improved methods are disclosed in U.S. Pat. Nos. 5,181,803; 5,288,171; 5,314,266 and 5,320,450. All four of these patents pertain to methods of disposing and/or recycling of construction and demolition debris. However, these patents do not deal with debris containing lead based paint, it being stated therein that materials which pose an undue risk to public health or the environment, such as industrial waste or by-products, paint, tar, solvents, creosote, adhesives and the like are typically excluded from construction and demolition debris. To exclude materials which have been covered with lead based paint is to exclude, in many cases, large quantities of such materials which must be processed, handled and disposed of in much more expensive ways. Thus, a real need exists for disposing of lead paint contaminated demolition debris without having to perform expensive procedures of the prior art and in such a manner as to permit disposal which meets both the spirit and the letter of regulatory intent. Such methods which would remove or stabilize hazardous material in a relatively inexpensive way should find great acceptance in the industry.

SUMMARY OF THE PRESENT INVENTION

The present invention provides a method of environmentally immobilizing or stabilizing lead paint contaminated construction or demolition debris so that it may be disposed of as non-hazardous waste. In the exemplary embodiment of the present invention, the debris is shredded and mixed with water and certain specified chemicals. The chemically treated debris is then collected and allowed to stand for a period of time sufficient for the chemicals to convert the soluble lead paint to an insoluble compound, immobilizing or stabilizing the lead. Excess water is drained and collected from the standing chemically treated debris. The treated and lead paint stabilized debris may then be disposed of in a non-hazardous waste landfill or any other suitable manner.

Of course, the foremost object of the method of the present invention is protection of human health and environment by safely processing, handling and disposing of lead paint contaminated debris. The object is to do so in a straight-forward manner and without utilizing techniques of dilution which attempt to circumvent environmental regulations.

By immobilizing or stabilizing lead paint contaminated debris (converting the lead to an insoluble compound) as in the present invention, the debris becomes non-hazardous. By doing so, the lead stabilized debris may be transported over public highways as non-hazardous debris to non-hazardous waste landfills. This usually results in shorter transport distances since hazardous waste landfills are sometimes located at remote locations.

By disposing of the stabilized lead paint contaminated debris in non-hazardous waste landfill, those designated for hazardous waste are not depleted as quickly. Furthermore, since the debris is shredded, reducing individual particle sizes, the volume occupied by the debris processed by the present invention is substantially reduced, reducing the amount of landfill space required to dispose of the debris.

Shredding and mixing of the construction or demolition debris with water and chemicals is performed under negative pressure, preventing possible release of any contaminated dust into the environment. Furthermore, those operating the apparatus for performing the method of the present invention may operate the process from outside of the negative pressure environment keeping them from being exposed to contaminated dust.

Thus, the present invention provides a method of handling, treating and disposing of lead paint contaminated construction or demolition debris by immobilizing or stabilizing the lead paint with certain chemicals. This is accomplished without having to separate the lead paint contaminated debris from other debris. In the method, the lead paint contaminated debris is converted to non-hazardous waste for further handling and disposal as such. Many other objects and advantages of the invention will be apparent from reading the description which follows in conjunction with the accompanying drawing.

BRIEF DESCRIPTION OF THE DRAWING

The drawing is a schematic representation of a method of stabilizing lead paint contaminated demolition debris, according to a preferred embodiment of the invention.

DESCRIPTION OF A PREFERRED EMBODIMENT OF THE INVENTION

Figure 1:
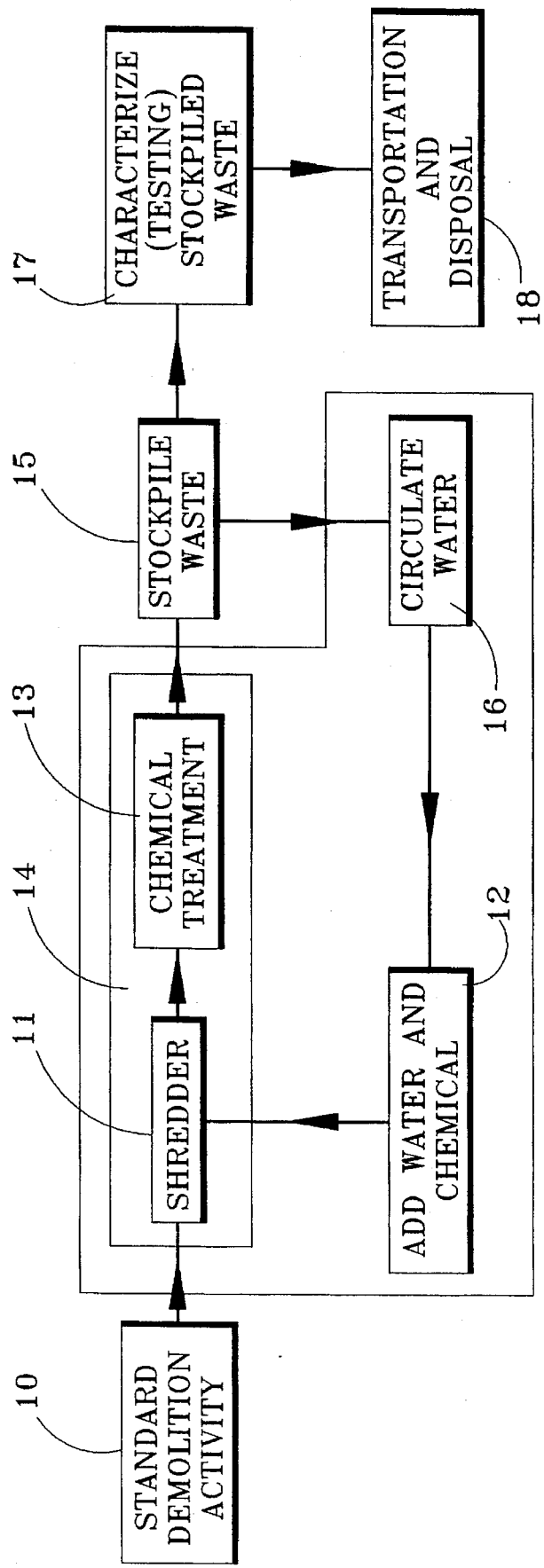

In normal demolition activities, easily separated, non-contaminated materials are separated from contaminated materials. The non-contaminated debris may be directly disposed of without treatment. If non-contaminated debris is difficult to separate from contaminated debris, it may be included as contaminated debris and treated in the method of the present invention.

The term "contaminated debris" as used herein, refers primarily to solid substrate materials, i.e. wood, drywall, glass, concrete, etc., to which has been applied lead based paint. The method of the present invention is not intended for lead paint on metal substrate. Metal substrate would be separated and recycled in melting furnaces to produce new steel products. The handling of lead on such metal substrate does not form a part of the present invention. In addition, other building products containing lead, such as lead sheets or pipes would also be separated for different handling.

Building materials that include contaminated substrates, anticipated for processing in the method of the present invention, typically are in the form of debris resulting from the construction and/or demolition of buildings such as office buildings, apartments, houses, schools, warehouses, etc. It is anticipated that the method of the present invention would be essentially performed at the site of such construction and/or demolition. In the drawing, this is indicated by an area referred to as "Standard demolition activity" 10.

In the first step of the method of the present invention, the lead paint contaminated debris, wood, drywall, glass, concrete, etc., is reduced in size from larger debris components to smaller solid components by shredding, grinding, or the like. Such shredding and size reduction substantially increases the surface area of the debris as compared to its volume. The size reduction may be accomplished utilizing conventional shredding or grinding apparatus in which the materials are typically fed into a hopper, the materials being further fed into mechanical or grinding shredding components. The grinder or shredder is illustrated in the schematic at 11.

While the debris is being reduced in size by grinding, shredding or the like, water and chemicals, specifically, at least one of a group of materials which includes fly ash, lime, Portland cement and kiln dust, may be metered thereinto. The equipment for adding water and chemicals is indicated at 12. The purpose of water is to keep the debris materials damp to aid in mixing and reaction of chemicals therewith and to suppress dust. The purpose of the specified chemicals is to convert the lead paint attached to the substrate debris from a soluble form of lead to an insoluble form. Since the particular lead compound of the paint may not be known, it may be necessary to bench test the paint with each of the specified chemicals to determine which is the most effective. The shredding of the debris and mixing with water and chemicals can be conducted in one or more steps. For example, the shredding at 11 may take place in one, two or more steps. Of course chemical treatment and stabilizing of the lead paint will begin immediately upon introduction of the water and chemicals at 11. However, additional mixing and chemical treatment could occur in further downstream positions such as indicated at 13. The amounts of water and chemicals necessary for proper conversion of the lead paint to an insoluble form may vary, due to variables such as the particular lead composition, porosity of the substrate, etc. It is anticipated that the amount of water may vary from 5% to 40% of the weight of the debris. The amount of chemical may vary from 1% to 35% of the weight of the debris.

Shredding the debris and mixing of water and chemicals with the debris are preferably performed in a negative pressure environment to reduce potential contamination of the atmosphere during these processes. For this reason, that portion of the shredder or grinder and mixing apparatus involved in these steps should be surrounded by a suitable barrier and the space within such barrier, indicated at 14, placed under negative pressure by a vacuum pump, blower, etc. All other steps and operations of the method of the present invention are conducted outside of the negative pressure environment. In fact, operation of the entire method would be controlled from outside.

After debris is shredded and mixed with water and chemicals, the treated debris is discharged and collected in a stockpile, indicated at 15. This may be accomplished using a stacking conveyor. Additional water spray may be introduced at the stacking conveyor to control any dust and provide adequate water to assure that the reaction between the lead paint and chemicals is completed to immobilize or stabilize the lead in the debris. The chemically treated debris at the stock pile 15 may require standing for up to 72 hours to assure chemical reaction completion.

As the treated material stands in the stock pile 15 excess water may be drained and collected therefrom at 16 for recirculation through the process. No water would be released to storm or sanitary drainage.

After sufficient standing time, the stockpile waste 15 would be tested using accepted procedures, e.g. one sample per 50 cubic yards of waste, to confirm that it meets non-hazardous land disposal requirements. The testing would assure that the material meets all regulatory requirements of state and national regulations.

Upon assurance that the lead paint in the chemically treated debris is satisfactorily stabilized (insoluble), the debris would be transported and disposed of. This is represented in the drawing at 18. Since the debris is now non-hazardous, it could be transported over public highways as non-hazardous construction debris to a non-hazardous landfill site or other point of disposal.

Thus, in the method of the present invention, lead paint contaminated construction or demolition debris is economically and environmentally stabilized so that it may be disposed of as nonhazardous waste. The method is unique and distinguishable from the prior art. Although a few variations of the invention have been described herein, many variations may be made without departing from the spirit of the invention. Accordingly, it is intended that the scope of the invention be limited only by the claims which follow.

We claim:

1. A method of environmentally stabilizing lead paint contaminated construction or demolition debris comprising the steps of:

shredding said lead paint contaminated debris;

mixing said shredded debris with water and at least one chemical selected from the group consisting of fly ash, lime, Portland cement and kiln dust;

collecting said chemically treated debris and allowing it to stand for a period of time sufficient to convert said lead paint from an unstable soluble form to a stabilized insoluble form;

draining and collecting excess water from said standing chemically treated debris; and disposing of said treated and lead paint stabilized debris.

2. The method of claim 1 in which said lead paint contaminated debris may comprise at least one of the following materials: wood, drywall materials, glass and concrete.

3. The method of claim 2 in which any painted metal substrate is separated from wood, drywall, glass and concrete construction debris prior to said shredding for separate handling thereof.

4. The method of claim 1 which said shredding of said lead paint contaminated debris and mixing of said chemicals therewith are conducted in an area of negative pressure.

5. The method of claim 1 in which said mixing of water with said shredded debris is conducted with sufficient water to keep said shredded debris damp at all time during said mixing of said chemicals therewith.

6. The method of claim 5 in which the amount of water mixed with said debris is 5% to 40% by weight of said debris.

7. The method of claim 5 in which the amount of said chemical mixed with said debris is 1% to 35% by weight of said debris.

8. The method of claim 1 in which additional water is sprayed on said collected and standing chemically treated debris to control dust and assure completion of said chemical reaction.

9. The method of claim 1 in which said collected and standing, chemically treated material is tested prior to said disposal thereof to assure that said chemical reaction is substantially completed and that said lead paint has been stabilized.

10. The method of claim 1 in which the amount of said chemical mixed with said debris is 1% to 35% by weight of said debris.

* * * * *